United States Patent [19]
Thompson

[11] 3,887,165
[45] June 3, 1975

[54] WATERING VALVE FOR ANIMALS

[76] Inventor: Earl Clayton Thompson, 448 S. First St., Hewitt, Tex. 76643

[22] Filed: Oct. 13, 1972

[21] Appl. No.: 297,454

Related U.S. Application Data

[63] Continuation-in-part of Ser. Nos. 99,154, Dec. 17, 1970, abandoned, and Ser. No. 161,532, July 12, 1971, Pat. No. 3,698,431.

[52] U.S. Cl. ............... 251/339; 251/303; 251/146
[51] Int. Cl. ............................................. F16k 1/16
[58] Field of Search .......... 251/339, 337, 358, 146, 251/303, 338; 137/604; 119/72.5, 75

[56] References Cited
UNITED STATES PATENTS

| | | | |
|---|---|---|---|
| 258,432 | 5/1882 | Keith | 251/303 |
| 1,359,522 | 11/1920 | Mueller | 251/358 X |
| 1,439,763 | 12/1922 | Schaffer | 251/303 |
| 2,310,080 | 2/1943 | Hill | 251/337 X |
| 2,368,887 | 2/1945 | Schuler | 251/358 |
| 2,710,594 | 6/1955 | Thompson | 251/339 X |
| 3,008,686 | 11/1961 | Becker | 251/339 X |
| 3,128,745 | 4/1964 | Alter | 251/339 X |
| 3,443,589 | 5/1969 | Benedetti | 137/604 |
| 3,456,684 | 7/1969 | Sochting | 251/337 X |
| 3,534,710 | 10/1970 | Olde | 119/75 |
| 3,578,286 | 5/1971 | Klimek | 251/303 |
| 3,581,713 | 6/1971 | Crooks | 119/72.5 |
| 3,582,006 | 6/1971 | Thompson | 251/146 |
| 3,601,318 | 8/1971 | Gehring et al. | 137/604 UX |
| 3,606,586 | 9/1971 | Piet et al. | 137/604 X |
| 3,646,955 | 3/1972 | Olde | 251/339 X |

FOREIGN PATENTS OR APPLICATIONS

| | | | |
|---|---|---|---|
| 2,601,230 | 12/1930 | Australia | 119/72.5 |
| 571,192 | 12/1957 | Italy | 251/339 |

*Primary Examiner*—Henry T. Klinksiek
*Attorney, Agent, or Firm*—Peter J. Murphy

[57] ABSTRACT

A valve for connection to a water supply line and operated by animals such as poultry or pigs to release drinking water from the line. In one form, the valve housing consists of two parts defining an axial flow passage with one part being received in a hole in the water conduit. A resilient clamp secures the assembly to the conduit and holds the housing parts together. In another form the valve housing is one piece having pipe threads at one end to be received in a tapped hole in the water supply conduit. In each form an enlarged chamber in the axial flow passage defines an annular valve seat; and a valve closure member includes a coacting valve head and a downwardly projecting stem movable by animals to release water to the valve. A frusto-conically shaped spring disposed within the enlarged chamber has its larger end contained by the housing and has its smaller end bearing on the head of the valve closure to urge the closure against its seat.

8 Claims, 14 Drawing Figures

PATENTED JUN 3 1975　　　　3,887,165

SHEET 1

INVENTOR
Earl Clayton Thompson

BY Cecil L. Wood
Peter J. Murphy
ATTORNEYS

WATERING VALVE FOR ANIMALS

REFERENCE TO RELATED APPLICATIONS

This is a continuation-in-part of application Ser. No. 99,154, filed Dec. 17, 1970, now abandoned, and application Ser. No. 161,532, filed July 12, 1971, now U.S. Pat. 3,698,431, issued Oct. 17, 1972.

BACKGROUND AND SUMMARY OF THE INVENTION

This invention relates to valves operable by animals for releasing drinking water; and is concerned with valves of the general type described in my U.S. Pat. Nos. 2,710,594, 3,582,006, and my above mentioned copending applications.

A principal object of this invention is to provide an improved construction of valves capable of operation by animals for releasing drinking water as needed.

Another object of this invention is to provide an improved construction of poultry drinking valves which are readily removed from and attached to a water supply conduit for purposes of cleaning, other servicing, or replacement.

A further object of this invention is to provide a valve of this type having two housing parts and improved sealing means between the housing parts.

Still another object of this invention is to provide a valve of this type having a rocking closure member and improved spring means for returning the closure member to the fully seated position.

These objects are accomplished in a valve comprising an elongated housing having passage means therethrough defined by an inlet chamber and a smaller axially aligned outlet passage providing a valve seat shoulder. A valve closure member includes an enlarged head seating on the shoulder and an elongated stem extending through and beyond the outlet passage. A frustoconical spring is retained in the inlet chamber, with its smaller end bearing on the enlarged upper surface of the closure member head, and with the valve housing including at least one annular retaining groove for axially and radially confining the larger end of the spring or an associated spring retaining member. More particularly, the housing may include at least two axially spaced retaining grooves for selective positioning of the spring within the valve housing.

The novel features and the advantages of the invention, as well as additional objects thereof, will be understood more fully from the following description when read in connection with the accompanying drawings.

DRAWINGS

DESCRIPTION OF THE PREFERRED EMBODIMENTS

FIGS. 1 through 8 of the drawings show several forms of valves particularly adapted for use in a poultry watering installation which would include one or more horizontally disposed water conduits 10, which may be plastic or metal pipe for example, and which are provided with longitudinally spaced holes 11 opening downward for accommodating the watering valves. The conduits 10 are preferably supported in a manner that they may be conveniently raised and lowered relative to the floor so that the valves are positioned at an appropriate height in accordance with the size of the animals to be watered; and the height of the conduit and valves may be changed as the animals grow for example.

Figure 1:
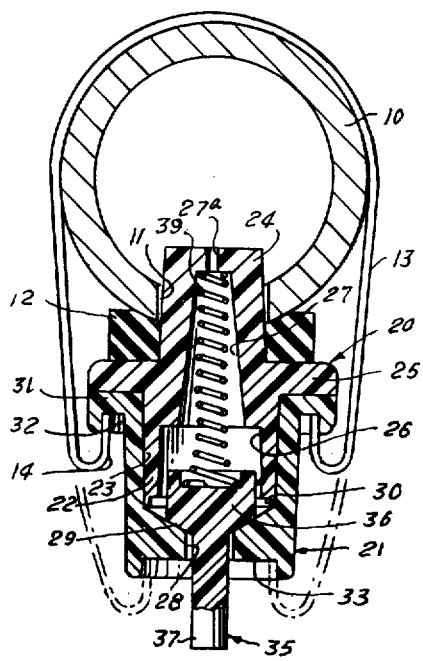
FIG. 1 is an axial sectional view of one form of valve according to the invention as mounted on and projecting laterally from a water conduit.

Referring to the valve of FIG. 1, the valve includes a two-part body or housing which consists of axially aligned and joined inner and outer portions 20 and 21 respectively which may be fabricated of a suitable plastic material for example. The housing outer portion is a cup-shaped member providing an axial recess 23 having cylindrical or slightly tapered walls; and the inner portion includes an axially projecting boss 22 having cylindrical or slightly tapered walls dimensioned for mating engagement with the recess 23 for axially aligning and joining the housing portions. The inner housing includes an oppositely directed axial boss 24 having cylindrical or slightly tapered walls to be received in one of the conduit holes 11. Intermediate the mating boss 22 and the conduit boss 24, the inner housing defines a radial flange 25 providing an upper surface for seating a resilient annular gasket 12 which surrounds the conduit boss for sealing engagement with the conduit 10 around the hole 11.

A valve chamber formed by the two housing portions is defined by a recess 26 opening from the end of the mating boss 22 of the inner housing which provides the side walls and upper wall of the valve chamber, with the lower wall being provided by the confronting base of the mating recess 23 of the outer housing. The valve chamber 26 forms a part of an axial flow passage through the valve housing which includes an axial passage 27 through the inner housing communicating with the valve chamber recess 26 and an axial passage 28 through the outer housing communicating with the base of the mating recess 231, and therefore with the valve chamber 26.

A valve closure member 35 includes an enlarged generally cylindrical head 36 and an axially projecting reduced diameter stem 37, with the head providing an outward facing annular beveled surface for sealing engagement with an annular beveled seat 29 defined by the base of the outer housing recess 23 surrounding the axial passage 28.

The beveled face of the closure member 30 and the beveled valve seat are configured for coacting sealing engagement when the closure member is urged against the valve seat. For this purpose, the inner end of the closure head 36 is provided with a recess 38 for enclosing the outer end of an elongated helical compression spring 39. The inner end of the compression spring is confined in the inner housing passage 27 which includes an outer enlarged tapered portion having its larger end opening to the valve chamber 26 and having its inner end communicating with the inner end of the conduit boss 24 through a small port 27a. The inner end of the tapered passage 27 then defines a shoulder for seating the inner end of the spring 39; and the tapered configuration of this passage portion permits lateral movement of the outer portion of the spring which occurs when the closure member 35 is rocked by the animals drinking from the valve.

The valve is operated by the animals principally through the rocking movement of the closure member resulting from the animals nibbling at the valve stem 37. The annular passage 23 is sufficiently large relative to the diameter of the stem 32 to permit this rocking movement of the valve to unseat the closure member from the seat and permit flow of water from the valve chamber along the valve stem. This rocking movement is resisted generally by the axial force of the spring and is further resisted by the enlarged outer end of the spring which acts on the valve head adjacent to its outer periphery thereby tending to again seat the closure member in its central position. Additionally, the valve may be opened by simple inward movement of the closure member against the force of the compression spring 39.

For improved sealing between the inner and outer housing portions, the outer end of the inner housing 22 which is the generally cylindrical annular wall surrounding the valve chamber recess 26 includes an axially projecting annular lip 30 which is relatively thin and flexible for sealing engagement with the outer periphery of the base wall of the outer housing recess 23.

The outer housing 21 includes a radial flange 31 at its inner end which provides an annular surface confronting the outer surface of the inner housing flange 25. The outer face of the outer housing flange 31 is provided with an outward facing annular groove recess 32.

The above described valve assembly is secured in assembled relation and secured in operative relation to the conduit 10 by means of a resilient clamp 13 which may be fabricated of a spring metal strap or a spring wire for example. As seen in the drawings, the clamp is an elongated member having hooks 14 formed at each end; and in the operative assembly the clamp is formed in a U-shaped configuration around the conduit 10 with the hooks 14 confronting each other and being engaged in the annular recess 32 of the outer housing 21. With the proper dimensional relationships, the clamp 13 holds the valve housing assembly in snug relation to the conduit; and the relatively soft resilient gasket 14 is compressed by the clamping pressure to provide a tight seal between the inner housing 20 and the conduit 10.

The outer housing 21 may be provided with a second clamp engaging recess 33 this being an outward facing recess provided at the outer end of the outer housing portion. The provision of alternative axially spaced clamp engaging recesses 32 and 33 provides for the use of clamps 13 of standard length to attach the valve assembly to conduits of different diameter. For example, if the valve of FIG. 1 is secured to a conduit of smaller diameter, the same clamp 13 might be used, but it would be latched in the outer recess 33 as indicated by the broken lines in FIG. 1. All of the following described valve assemblies are secured to a conduit 10 in the same manner, as seen in the drawings.

Figure 2:
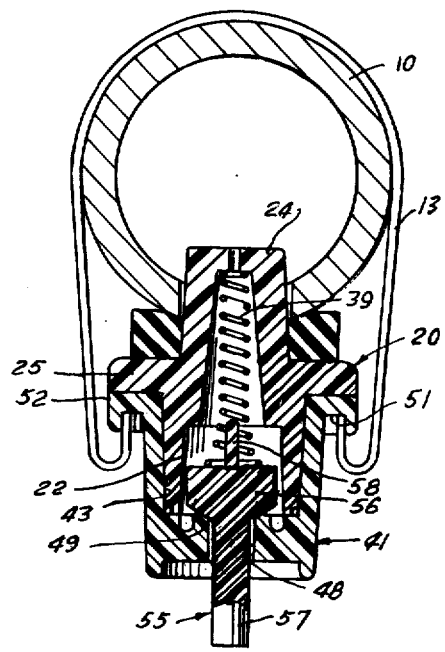
FIGS. 2, 3 and 4 are sectional views similar to FIG. 1 showing alternative forms of valves according to the invention.

In the valve assembly of FIG. 2, the inner housing 20 is identical to that described and the several parts are identified by the same reference numbers. The outer housing 41 is similar in configuration to the previously described outer housing 21, being a cup-shaped member providing a mating recess 43 for alignment with the inner housing and having an inner flange 51 and associated annular recess 52 to be engaged by the hooks of the clamp 13. The base of the recess 43 is formed differently to provide a valve seat 49 in the form of an inwardly projecting annular lip surrounding the outer housing passage 48; and which is engaged in sealing relation by the beveled surface of the valve closure member 55.

The closure member 55 is similar in configuration to the previously described member having a head 56 and projecting stem 57; however, the closure member is provided with an inwardly projecting axial finger 58 for retaining the outer end of the compression spring 39. The finger 58 maintains the axial alignment of the compression spring 39 and the valve closure member 55; and the enlarged outer end of the compression spring again serves to act on the outer periphery of the closure head in the manner described.

Figure 3:
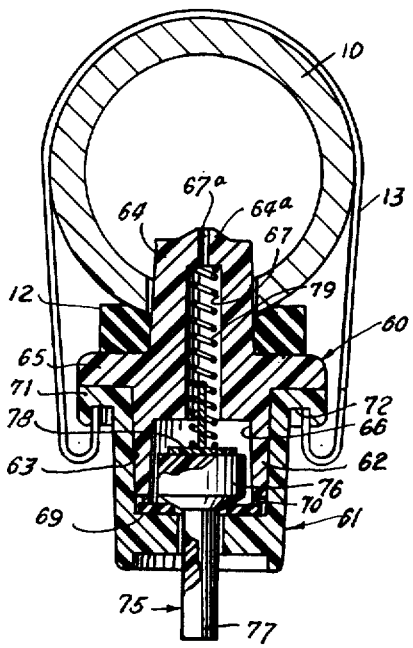

In the valve assembly of FIG. 3, the inner housing 60 is generally similar to the housing 20 of FIG. 1 having a mating boss 62 defining a valve recess chamber 66, and having a conduit boss 64 received in the hole 11 of the conduit. In this configuration, the inner housing passage 67 is cylindrical in shape rather than tapered; and includes an inner port 67a communicating with the inner end of the conduit boss and defining an inner shoulder for seating the inner end of a compression spring 79 which is a uniform cylindrical spring in this configuration.

The inner end of the conduit boss 64 is provided with a raised lip 64a surrounding the port 67a to give the inner end of the boss a convex configuration. With this configuration, any sediment which may be carried in the water and which may tend to deposit on the boss 64 will likely be carried away from the inlet of the port 67a.

The outer housing 61 is again generally similar to the previously described outer housing including a cup-shaped member defining a mating recess 63 and having an inner radial flange 71 engaged by the clamp 13. The valve seat 69, in this configuration, is defined by an annular resilient gasket disposed at the base of the housing recess 63 and surrounding the axial passage 68. The valve seat gasket 69 is engaged by the beveled head of the closure member 75 to close the valve. The valve gasket 69 substantially covers the base of the recess 63; and in the assembled relation of the inner and outer housings 60 and 61, the axially projecting annular lip 70 of the inner housing engages the valve gasket to provide improved sealing between the inner and outer housings.

In this configuration, the inner face of the valve closure member 75 is a flat surface; and the compression spring 79 acts on the closure member through a bearing member 78 which includes a disc portion confronting and bearing on the upper surface of the closure member head 76 and an inwardly projecting axial finger which is received within the outer end of the compression spring 79 and which extends upwardly into the inner housing recess 67.

In this configuration of the valve closure member, and cylindrical spring confining passage 67, when the closure member 75 is rocked to open the valve, the spring is maintained radially centered and some sliding may occur between the valve closure member and the bearing member 78 to assure closing of the valve when the valve stem is released by the animal.

Figure 4:
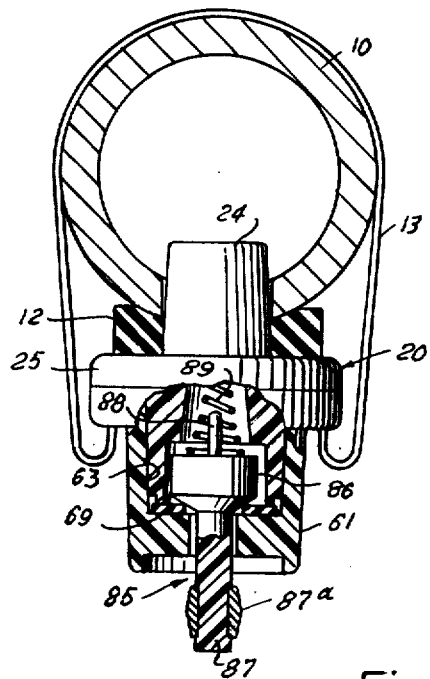

The valve assembly of FIG. 4 includes an inner housing 20 identical in configuration to the inner housings of FIGS. 1 and 2, and an outer housing 61 identical in configuration to the outer housing of FIG. 3.

The valve closure member 85 in this configuration is quite similar to the closure member 55 of FIG. 3 including a head 86, stem 87 and finger 88 received in the enlarged outer end of a compression spring 89 which has the same configuration as the compression spring 39 of FIG. 1.

All of the valve closure members above described, as illustrated in the drawings, are preferably fabricated of a plastic material for ease of manufacture and additionally because this material is non-corrosive. Depending on the durability of the plastic material, the stems which are engaged by the drinking animals are subject to wear and distortion. To obviate the necessity for too frequent replacement of a plastic valve closure member, the closure member 85, as illustrated in FIG. 4, may include a metallic sleeve or ferrule 87a substantially enclosing the projecting portion of the stem 87.

Figure 5:
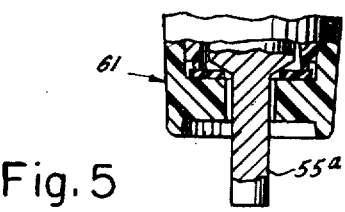
FIG. 5 is a fragmentary axial sectional view of a valve assembly illustrating an alternative form of valve closure member.

FIG. 5 of the drawing illustrates an alternative configuration for the valve assembly of FIG. 4 wherein the valve closure member 55a may have a configuration identical to that of the valve closure member 55 of FIG. 2 except that the closure member is fabricated of a metal rather than a plastic material for improved durability.

Figure 6:
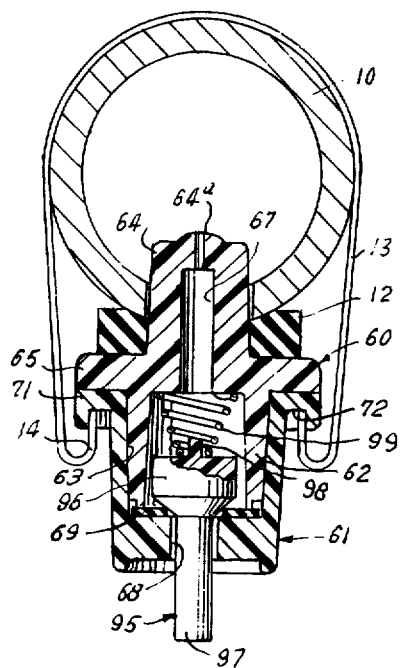
FIGS. 6 and 7 are sectional views similar to FIG. 1 illustrating other alternative forms of valves according to the invention.

In the valve configuration of FIG. 6, the inner and outer valve housings have the same configuration as the inner and outer housings 60 and 61 respectively of FIG. 3. The valve closure member 95 is generally similar to the closure member 55 of FIG. 2 including a head 96, a stem 97 and an axial finger 98 projecting inward from the head 96.

In this configuration, the valve spring is a relatively short frusto-conically shaped spring having its larger end bearing against the inner wall of the valve chamber 66 surrounding the passage 77, and having its smaller end enclosing the finger 98 of the valve closure member. With this configuration the spring 99 is confined against a lateral movement since the larger inner end has a diameter substantially corresponding to the diameter of the valve chamber 61 at its inner end; and this spring configuration then resists lateral movement of the smaller outer end as well, of course, as the axial inner movement. This resistance to lateral movement resists the rocking of the upper end of the valve closure member which would result from the actuation of the valve by the animals, and returns the valve to its normal seating position.

Figure 7:
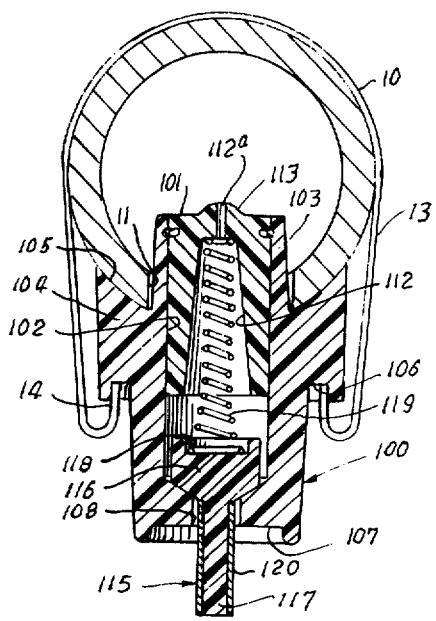
Figure 8:
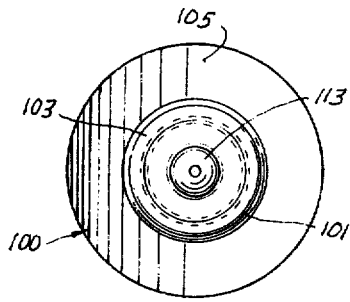
FIG. 8 is a top view of the valve assembly of FIG. 7, as viewed apart from the water conduit and resilient clamp.

FIGS. 7 and 8 of the drawing illustrate a different form of valve assembly including a two-part housing consisting of an outer housing 100 and an inner housing 101. The outer housing is again a cup-shaped member having a much deeper recess 102 which partially defines the valve chamber as will be described, with the recess opening at the inner end of the housing through a conduit boss 103 which is dimensioned to be received in a hole 11 of the conduit 10.

The outer housing 100 includes an intermediate external radial flange 104 providing an inward facing cylindrical surface 105 which surrounds the conduit boss 103 and defines a cylindrical surface to conform and seal against the outer cylindrical surface of the conduit 10. With the outer housing being fabricated preferably of a plastic material which is somewhat resilient, an adequate seal between the housing and conduit will be provided without the necessity for a sealing gasket such as the previously described gasket 12. The outer facing surface of the flange portion 104 is provided with an outward facing annular groove or recess 106 for receiving the hooks 14 of a resilient clamp 13 to clamp the outer housing to the conduit in the manner previously described. The housing also includes an outward facing recess 107 at its outer end as an alternative recess for engagement by the hooks of a clamp 13. An axial passage 108 communicates the base of the recess 102 with the outer end of the housing 100; and the base of the recess is tapered to define a tapered valve seat similar to that of the valve assembly of FIG. 1.

The inner housing 101 is in the form of a plug received in the outer housing recess 102, and retained in the upper portion of the recess by means of a snap ring 111 for example. The inner housing includes an axial passage defined by a tapered portion 112 larger at the outer end, with the inner end of the passage terminating in a port 112a which opens to the interior of the conduit. A raised lip 113 surrounds the port 112a at the inner end of the inner housing 101 to prevent the entry of sediment into the valve. A valve closure member 115 is similar to the valve closure member 35 of FIG. 1 including a head 116 and stem 117 defining an annular beveled seating surface, with the inner face of the head 116 including a recess 118 for confining the outer end of a compression spring 119 having the same configuration as the spring of FIG. 1. The valve stem 117, which is illustrated as being fabricated of a plastic material, includes a protective metal sleeve 120 enclosing the exposed surface of the stem for improved durability.

In this configuration, the inner housing 101 functions as a retainer for the valve compression spring 119 to provide the desired valve operation; and the valve assembly functions in the same manner as the previously described valves.

FIG. 8 is a view from the top or inner end of the valve assembly of FIG. 7 as viewed apart from its association with the conduit 10.

FIGS. 9 through 13 of the drawings show several forms of valves adapted for use by poultry or by heavier animals.

Figure 9:
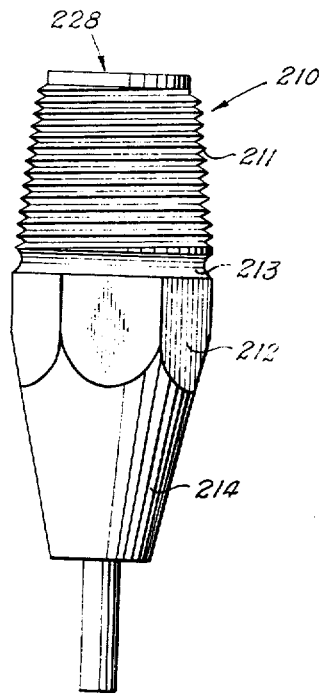
FIG. 9 is an elevation view of another form of valve having pipe threads for securing the valve to a water supply conduit.
Figure 10:
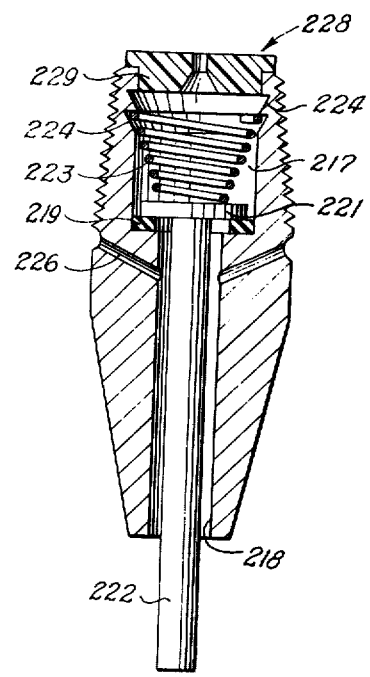
FIG. 10 is an axial sectional view of the valve of FIG. 9 showing one means for retaining the valve spring.

FIGS. 9 and 10 illustrate one form of valve having a metal housing 210 generally cylindrical in shape, having a pipe thread 211 formed at its inlet end, a hex portion 212 formed intermediate the ends for engagement by a suitable wrench with the hex portion being separated from the pipe thread by an annular groove 213, and a conically tapered nose 214 formed at the outlet end. An inlet chamber 217 is formed from an enlarged axial bore formed from the inlet end; and an outlet passage 218 is formed by a smaller bore extending between the inlet chamber and the outlet end of the housing. A transverse annular shoulder formed between the inlet chamber and outlet passage defines a valve seat; and an annular resilient washer 219 disposed on the seat defines a sealing member for engagement by the valve closure member. As seen in FIG. 10 the gasket 219 has an outer diameter corresponding to the diameter of the inlet chamber, and an inner diameter which is larger than the diameter of the opening to the outlet passage.

The valve closure member includes a flat disc-like head 221 having a diameter somewhat less than that of the inlet chamber, and having an axially extending stem 222 which extends through the outlet passage 218 and beyond the end of the housing nose 224. The diameter of the stem 222 is less than that of the outlet passage to provide an annular flow passage for water when the valve is opened.

The respective diameters of the inlet chamber, outlet passage, closure member head, and closure member stem are such that movement of the closure member by the animals, as will be described, will result in engagement of the chamber sidewalls by the head to effect the cleaning of these walls and prevent a buildup of minerals or other sediment.

The closure head 221 is urged against the seat gasket 219 by a compression spring having a frusto-conical configuration with overlapping coils. The larger end of the spring has a normal diameter greater than that of the inlet chamber 217; and the walls of this chamber are provided with a pair of axially spaced annular grooves 224 for the purpose of receiving and retaining the larger end of the spring in a selected axial position. The smaller end of the spring then bears on the central portion of the head 221 to maintain the closure member in engagement with the valve seat.

Transverse aeration passages 226 communicate between the outlet passage 218 and the housing exterior groove 213, with the aeration passages opening to the outlet passage adjacent to the valve seat, and angling toward the housing inlet end.

An orifice plate 228 closes the inlet end of the inlet chamber to control the rate of water flow through the valve. This cap is preferably fabricated of a plastic material.

Figure 11:
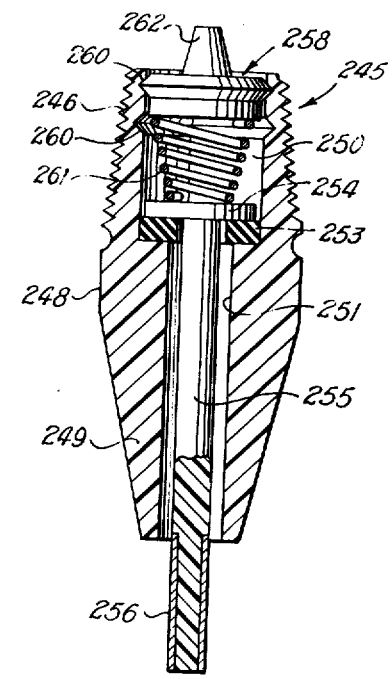
FIG. 11 is a modified form of valve similar to FIG. 9, with the spring being retained by an orificeplug.
Figure 12:
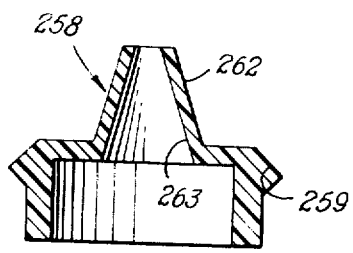
FIG. 12 is an axial sectional view of the orifice plug of FIG. 11.

FIGS. 11 and 12 of the drawing illustrate another form of valve including a housing 245 fabricated of plastic having a pipe thread 246, external groove 247, hex 248 and nose 249. An inlet chamber 250 and outlet passage 251 are formed in the manner described. The valve seat as defined by a gasket 253 for seating the valve closure member including a relatively flat head 254 and a downwardly projecting stem 255. This closure member is an integral member fabricated of plastic and includes a metallic wear sleeve 256 enclosing the lower portion of the stem which projects from the end of the valve housing. An orifice plug is a cup-shaped member, again preferably fabricated of a plastic material, having an annular rib or bead 259 of a maximum diameter slightly greater than that of the inlet chamber. The inlet chamber is provided with a pair of axially spaced, inward facing annular grooves 260 adjacent to the inlet end of the valve housing for receiving and retaining the orifice plug rib 259, thereby retaining the aperture cap within the valve housing.

In this configuration, the larger end of the frusto-conical spring 261 has a diameter corresponding to that of the inlet chamber and is engaged by the skirt of the orifice plug 258 to retain the spring within the chamber and compress the spring to urge the closure member in sealing relation. Through selective placing of the plug 258, the spring compression is adjusted.

The orifice plug includes a single central boss 262 which is frusto-conical in shape and defining an inlet passage 263 which is also frusto-conical in section. With this configuration, the inlet opening defined by the inlet passage 263 may be enlarged by shearing or removing a portion of the boss tip.

In this configuration the outlet passage 251 may be slightly larger relative to the closure member stem 255 to provide a larger annular flow passage from the valve seat. The seat washer 253 has an outer diameter corresponding to the diameter of the inlet chamber, and has an inner diameter less than the diameter of the outlet passage. With this arrangement, when the valve is opened, the water flowing through the annular passage between the seat washer and the valve stem will move into a larger annular chamber immediately beneath the seat washer, and will flow down the walls of the passage or along the stem without filling the annular flow passage. It has been discovered that the water emerging from the seat washer mixes with air in the area immediately beneath the seat washer to produce an aeration of the water and a freshening of the water. The air mixing with the water is carried out of the valve along with the water flow, thereby creating reduced pressure at the upper end of the inlet passage; and this air is replaced by air flowing upward through the outlet passage.

Figure 13:
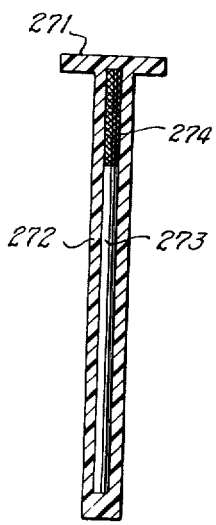
FIG. 13 is an axial sectional view of an alternative form of valve closure member.

FIG. 13 of the drawing illustrates a modified form of valve closure member having the external configuration as above described including an enlarged flat head 271 and a projecting stem 272. This is an integral closure member molded of plastic and having a length of stainless steel wire 273 for example embedded in the stem and extending substantially the entire length of the stem. The wire is preferably knurled or otherwise serrated at least at its end adjacent to the head 271. This embedded wire 273 will make the stem more rigid and more resistant to wear, and enable operation of the valve after the plastic is worn away. The serrations 274 will prevent the wire from being pulled out.

Figure 14:
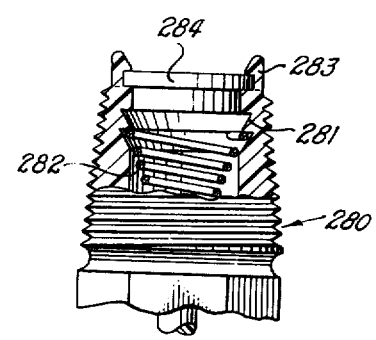
FIG. 14 is a fragmentary view, partially in section, of a modified form of valve similar to FIG. 9.

FIG. 14 of the drawing illustrates another modified form of valve having an overall configuration similar to that of FIG. 10 including at least one internal annular groove 281 for retaining the larger end of the frusto-conical valve spring 282. In the valve of FIG. 14, the housing is fabricated of a plastic material for example and is provided with two integral, pawl-like fingers 283 which project in an axial direction from the inner end of the housing at opposite sides. These fingers 283 include radially inward directed hooks or latches to retain an orifice plate 283 which may be similar in configuration to that of FIG. 10.

In the configuration of FIG. 10, the orifice plate 228 is retained in place only because of a snug or press fit; and occasionally these orifice plates may be dislodged due to surges in the conduits or air flow in a reverse direction. The pawl fingers 283, then, are provided to prevent dislodgement of the orifice plate under these conditions. Where the valve housing is fabricated of metal, similar pawl fingers may be provided which are either integral with the housing or which are attached to the housing in a suitable manner.

What has been described is an improved water dispensing valve for animals including a number of features for improving the performance of the valves. An important feature is the provision of a frusto-conical shaped compression spring which, in addition to assuring closure of the valve closure member even under low water pressure, serves the additional purpose of providing a cushioning stop for limiting axial movement of the closure member and thereby reducing wear or damage to the valve seat due to impact of the closure member on the seat when released. With the frusto-conical configuration, there is small resistance to initial opening of the valve by the animal since the larger coils are compressed, but the resistance to movement of the closure member increases with movement when the smaller coils are compressed. The spring, having an interfering coil configuration, defines a positive stop which prevents the closure member from being pushed too far into the housing, with possible resulting hangup of the head to prevent closure.

A further advantage of the frusto-conical configuration is that the smaller end of the spring is maintained at the axial center of the considerably larger bearing surface of the valve closure member; therefore, the force of the spring is maintained at the center of the closure member to assure proper seating, and the possibility of the spring moving off the closure member and becoming jammed between the closure member head and the housing wall is minimized.

Another feature of the invention is the provision of the multiple retaining grooves for selectively positioning the upper end of the frusto-conical spring, either by retaining the spring itself or by retaining an orifice plug which serves as the spring retaining member.

Another feature of the invention is the provision of aeration passages and other structural arrangements to provide for air freshening of the water flowing from the valve.

Another feature of the invention is the provision, in plastic embodiments of the valve, for a closure member stem which includes wear resistant features for prolonging the life of the valve.

Another feature of the invention is the provision of improved sealing between the housing parts of a two-part valve housing.

Another feature of the invention is the provision of latching fingers on the valve housing to retain an orifice plate.

While preferred embodiments of the invention have been illustrated and described, it will be understood by those skilled in the art that changes and modifications may be resorted to without departing from the spirit and scope of the invention.

What is claimed is:

1. A water dispensing valve for animals comprising an elongated housing; passage means extending longitudinally through said housing including a valve chamber and an outlet passage of smaller cross-section than said valve chamber communicating said valve chamber with the outlet end of the housing; transverse shoulder means between said valve chamber and outlet passage defining an annular valve seat;

a valve closure member comprising an elongated stem of smaller cross-section than that of said outlet passage, and a radially enlarged head for sealing engagement with said annular valve seat; said stem extending through said outlet passage and beyond the housing outlet end;

a frusto-conical shaped compression spring in said valve chamber for urging said closure member head into engagement with said valve seat;

at least two axially spaced, annular retaining groove means in said housing passage means for axially and radially retaining the larger end of said spring with its smaller end bearing on said closure head; the larger end of said spring having a normal diameter greater than the diameter of said retaining groove means, whereby said spring is urged into a selected one of said groove means for selective positioning of said spring relative to said housing.

2. The valve of claim 1 characterized by, said valve chamber being circular in cross-section and said closure head being circular in cross-section having a diameter only slightly less than that of said valve chamber, whereby the closure head during operation of the valve engages the chamber walls in an abrasive relation.

3. The valve of claim 2 characterized by said closure member head and stem being dimensioned relative to said housing valve chamber and outlet passage, respectively, whereby said head may move laterally into abrasive relation with the valve chamber wall.

4. The valve of claim 1 characterized by said closure member head having a relatively large, flat bearing surface coacting with the relatively smaller end of said spring, to permit lateral movement of said closure member head relative to said spring.

5. The valve of claim 1 characterized by said frusto-conical spring being configured with adjacent coils in axially interfering relation to provide an inner limit of closure movement.

6. The valve of claim 1 characterized by, said valve closure member being fabricated of a relatively soft material; and a wear sleeve of relatively hard material surrounding the projecting portion of said valve closure stem.

7. The valve of claim 1 characterized by, said valve closure member being an integral member fabricated of a relatively soft material, and the stem thereof having an elongated metal member embedded therein and extending substantially its entire length.

8. A water dispensing valve for animals comprising an elongated housing; passage means extending longitudinally through said housing including a valve chamber and an outlet passage of smaller cross-section than said valve chamber communicating said valve chamber with the outlet end of the housing; transverse shoulder means between said valve chamber and outlet passage defining an annular valve seat;

a valve closure member comprising an elongated stem of smaller cross-section than that of said outlet passage, and a radially enlarged head for sealing engagement with said annular valve seat; said stem extending through said outlet passage and beyond the housing outlet end;

a frusto-conical shaped compression spring in said valve chamber for urging said closure member head into engagement with said valve seat;

at least two axially spaced, internal, annular retaining groove means in said housing passage means; an orifice plug fabricated from a resilient material and dimensioned to be received within said passage means, said plug being provided with an annular rib having a normal maximum diameter greater than the diameter of said chamber whereby said rib is urged into a selected one of said groove means to retain said orifice plug at a selected axial position; said plug retaining the larger end of said spring.

* * * * *